April 12, 1927.
E. C. STACY
SWIVEL LINK
Original Filed July 2, 1924
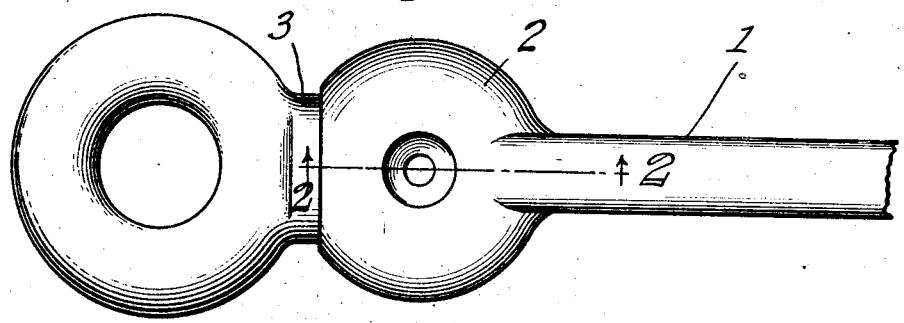
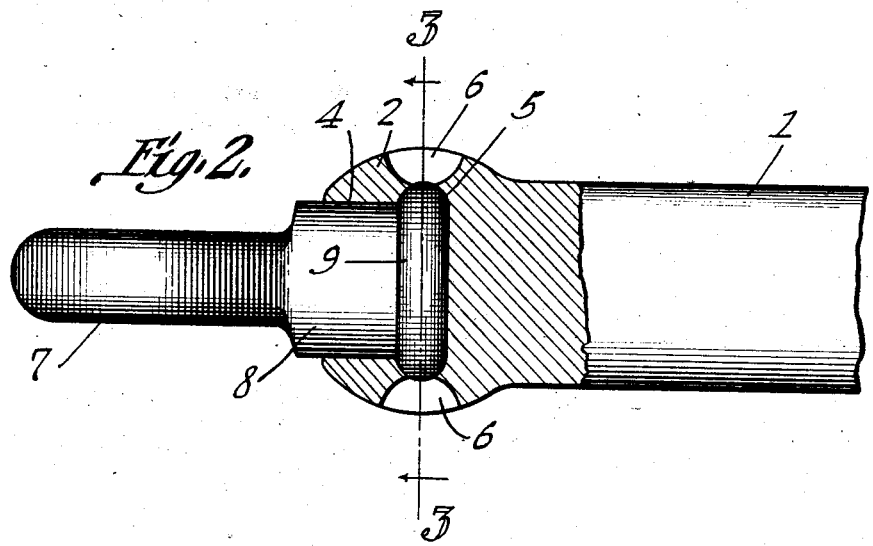
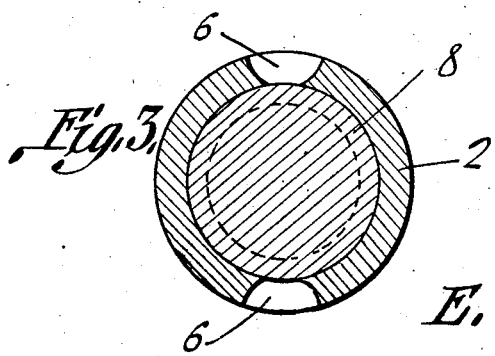
Inventor
E. C. Stacy Patented Apr. 12, 1927.

1,624,441

UNITED STATES PATENT OFFICE.

EUGENE C. STACY, OF TIFFIN, OHIO.

SWIVEL LINK.

Original application filed July 2, 1924, Serial No. 723,773. Divided and this application filed January 2, 1925. Serial No. 190.

This invention relates to a swivel link designed primarily for use in connection with load binders such as disclosed, for example, in my Patent No. 1,538,412 issued on May 19, 1925.

This application is a division of my copending application Serial No. 723,773 filed July 2, 1924, now Patent No. 1,535,350 dated April 28, 1925, covering a method of making swivel links.

A load binder, in order to be properly effective, must have a link to which an eye is swiveled and in the load binders constructed by me, these swivels are coupled to the links by a method of casting. It is an object of the present invention to provide a swivel link in which the eye is not detachable from the link except by breaking, the metal of the link being so shaped as to retain the eye assembled therewith so that it can rotate relative to the link but cannot be detached.

Another object is to provide a structure of this character which can be easily lubricated by the provision of openings designed to supply a lubricant to the contacting relatively movable surfaces of the link and its swivel eye.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is an elevation of a portion of the swivel link such as constitutes the present invention.

Fig. 2 is a view therethrough partly in section and partly in elevation showing how the parts interfit, the portion in section being on the line 2—2, Fig. 1.

Fig. 3 is a section on line 3—3, Fig. 2.

Referring to the figures by characters of reference 1 designates a link which can be of any desired proportions and one end of this link is enlarged, as shown at 2 and provided with a relatively flat end 3. Extending into this flat portion of the enlargement is a cylindrical opening or recess 4, the inner end of which is enlarged by the formation of the annular groove 5. One or more recesses 6 are formed in the outer surface of the enlargement 2 and communicate with the groove 5 as shown particularly in Figs. 2 and 3.

The eye 7 of the device is provided with a cylindrical stem 8 fitting snugly within the recess 4 but adapted to rotate freely therein. On this stem is an integral annular rib 9 which is rounded transversely and adapted to practically fill the groove 5. Thus the stem 8 is prevented from being withdrawn from the enlargement 2 but can rotate freely within said enlargement.

Importance is attached to the fact that the stem 8 and its rib 9 are integral and that the enlargement 2, which is formed of the casting, straddles all portions of the rib and fits snugly about the stem 8. It is also important that the recesses 6 communicate with the grooves 5. These recesses have a double function. First, they facilitate casting of the enlargement about the stem 8 and rib 9 as explained in my copending application herein referred to and, second, they provide means whereby a lubricant can be supplied readily to the contacting surfaces of the rib 9 and the groove 5 and to the recess 4 and the stem 8.

What is claimed is:—

A swivel link for load binders and the like including a cylindrical stem, an annular rib upon the stem, a link member formed of a casting having a recess, the wall of said recess extending continuously around the stem and rib and fitting snugly upon but rotatable relative to the stem and rib, there being openings formed in the link member by casting, the said openings extending to the periphery of the rib.

In testimony that I claim the foregoing as my own, I have hereto affixed my signature.

EUGENE C. STACY.